United States Patent [19]
Davis, Jr. et al.

[11] Patent Number: 5,974,350
[45] Date of Patent: Oct. 26, 1999

[54] COMPACT FUZZY LOGIC ALGORITHM

[75] Inventors: Leighton Ira Davis, Jr., Ann Arbor; Gerhard Allan Dage, Franklin; Edmund Joseph Gurney, III, Canton, all of Mich.; Michael Bradley Bauer, Chicago, Ill.

[73] Assignee: Ford Global Technologies, Inc., Dearborn, Mich.

[21] Appl. No.: 08/872,887

[22] Filed: Jun. 11, 1997

[51] Int. Cl.⁶ ........................................... G06G 7/00
[52] U.S. Cl. ................................ 701/36; 701/40; 706/4
[58] Field of Search ........................... 701/36, 40; 236/49.3, 236/49.5, 91 C; 165/201, 41; 706/4

[56] References Cited

U.S. PATENT DOCUMENTS

| | | | |
|---|---|---|---|
| 5,427,313 | 6/1995 | Davis, Jr. et al. | 236/49.3 |
| 5,491,775 | 2/1996 | Madau et al. | 315/3 |
| 5,516,041 | 5/1996 | Davis, Jr. et al. | 236/49.3 |
| 5,549,152 | 8/1996 | Davis, Jr. et al. | 236/49.3 |
| 5,553,776 | 9/1996 | Davis, Jr. et al. | 236/49.3 |
| 5,570,838 | 11/1996 | Davis, Jr. et al. | 236/49.3 |
| 5,579,994 | 12/1996 | Davis, Jr. et al. | 236/49.3 |

Primary Examiner—William A. Cuchlinski, Jr.
Assistant Examiner—Yonel Beaulieu
Attorney, Agent, or Firm—Paul K. Godwin; Roger L. May

[57] ABSTRACT

A fuzzy logic algorithm utilizes a single rule to produce a varying output signal. A plurality of input signal values are received from a plurality of sensors. A predetermined combination of a plurality of membership functions in the single fuzzy logic rule are defined in which a first instance of the predetermined combination based on a first set of inputs yields a first output signal defined by a first and second axis. A second instance of the predetermined combination based on a second set of inputs different from the first set of inputs yields a second output signal substantially identical to the first output signal, except the second output signal is shifted along one of the first and second axes. A controller produces digital output signals based on the first and second output signals to produce the varying output signal.

16 Claims, 7 Drawing Sheets

Fig. 4a (PRIOR ART)
Fig. 4b (PRIOR ART)
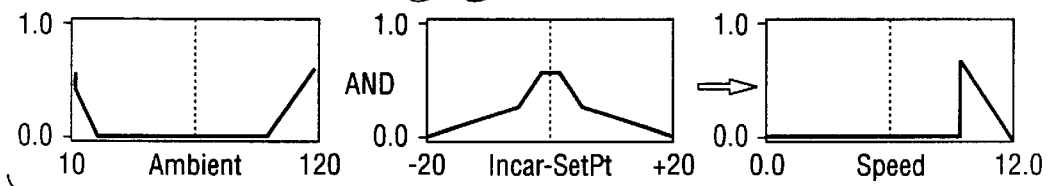
Fig. 4c (PRIOR ART)
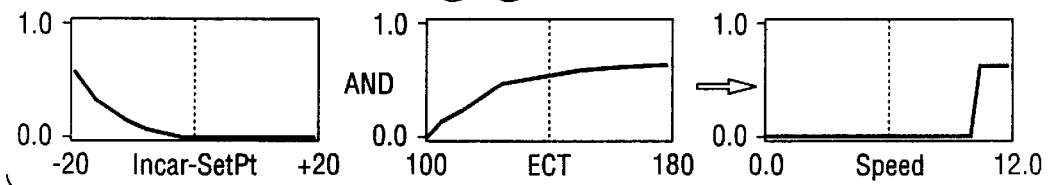
Fig. 4d (PRIOR ART)
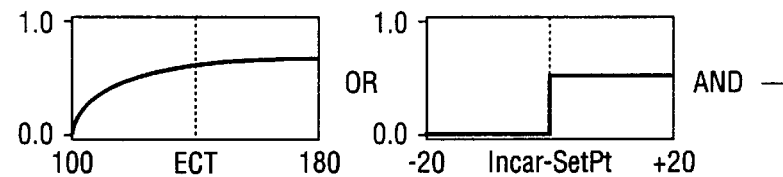
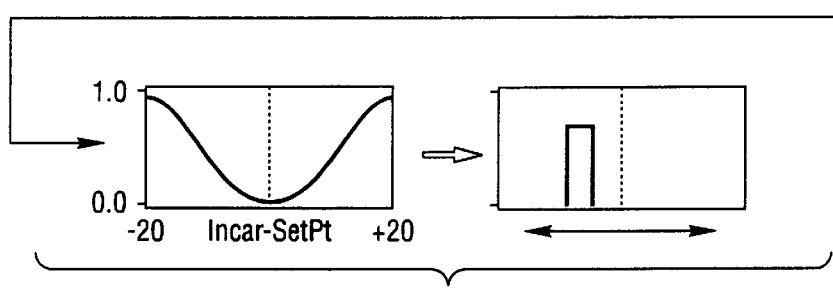
Fig. 5

COMPACT FUZZY LOGIC ALGORITHM

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to methods and system for generating process control signals which vary in response to changing input signals in accordance with constraints imposed by rules.

BACKGROUND ART

A technique called "fuzzy logic," developed by Dr. Lotfi Zadeh and described in "Fuzzy Sets," Information and Control, Vol. 8, No. 3, June 1965, pp. 338–53, has proven highly effective in controlling complex systems. Using fuzzy logic, input variables are processed against a collection of rules, each of which expresses a system objective in propositional form; for example: "if velocity is low and rpm is low then shift to 1st gear." Unlike conventional logic, in which conditions are either satisfied or not satisfied, the conditions "velocity is low" and "rpm is low" may be only partially satisfied so that the rule is only partially satisfied.

The use of fuzzy logic, however, may require a substantial amount of memory. The use of numerous rules in a rule set, often the result of the use of the "matrix" approach, or the employment of detailed nonlinear membership functions, may cause a strain on memory resources. There are many applications in which such resources are not plentiful, or in which key parameters should be stored so that they are readily accessible (e.g., in non-volatile memory rather than read-only memory while the control function is still being developed and calibrated). In these cases, it may be advantageous to have a more parsimonious implementation which supports the functionality of fuzzy logic, yet bend some of its principles.

In particular, in order for the typical (Mamdani "Max-Min" algorithm) fuzzy logic control algorithm to produce a useful variation of the output, it is necessary to have more than one rule. Variation of output is obtained by the consequents of two (or more) rules playing against each other. A side effect of this method of generating variation in output is the difficulty in producing an explicit output value for particular values of inputs. If the desired output is known for specific inputs, some experimentation and iteration is needed to obtain the necessary membership functions that yield the desired relationship.

For these reasons, there exists a need for a variation of the usual fuzzy logic algorithm in which the parameterization is more compact and the relationship between the output function and the input signals is more explicit.

DISCLOSURE OF THE INVENTION

It is thus a general object of the present invention to provide a method and system for performing a compact parameterization and generating a varying output function in which the relationship between input signals and the output function is explicit.

In carrying out the above object and other objects, features, and advantages of the present invention, a method is provided for producing a varying output function utilizing one fuzzy logic rule. The method includes the step of receiving a plurality of input signal values. The method further includes the step of defining a plurality of membership functions in the fuzzy logic rule having a predetermined combination wherein a first instance of the predetermined combination based on a first set of inputs yields a first output signal defined by a first and second axis and wherein a second instance of the predetermined combination based on a second set of inputs different from the first set of inputs yields a second output signal substantially identical to the first output signal, except the second output signal is shifted along one of the first and second axes. Finally, the method includes the step of producing digital output signals based on the first and second output signals to produce the varying output signal.

In further carrying out the above object and other objects, features, and advantages of the present invention, a system is also provided for carrying out the steps of the above described method. The system includes a plurality of sensors for sensing a plurality of input signal values. The system further includes a controller operative to store a plurality of predefined membership functions of the fuzzy logic rule having a predetermined combination wherein a first instance of the predetermined combination based on a first set of inputs yields a first output signal defined by a first and second axis and wherein a second instance of the predetermined combination based on a second set of inputs different from the first set of inputs yields a second output signal substantially identical to the first output signal, except the second output signal is shifted along one of the first and second axes. The controller is further operative to produce digital output signals based on the first and second output signals to produce the varying output signal.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIGS. 4a through 4d are graphical illustrations of a prior art blower speed rule set including antecedent and corresponding consequent membership functions;

FIG. 5 is a graphical illustration of a blower speed rule including antecedent membership functions and corresponding varying output function;

BEST MODES FOR CARRYING OUT THE INVENTION

Figure 1:
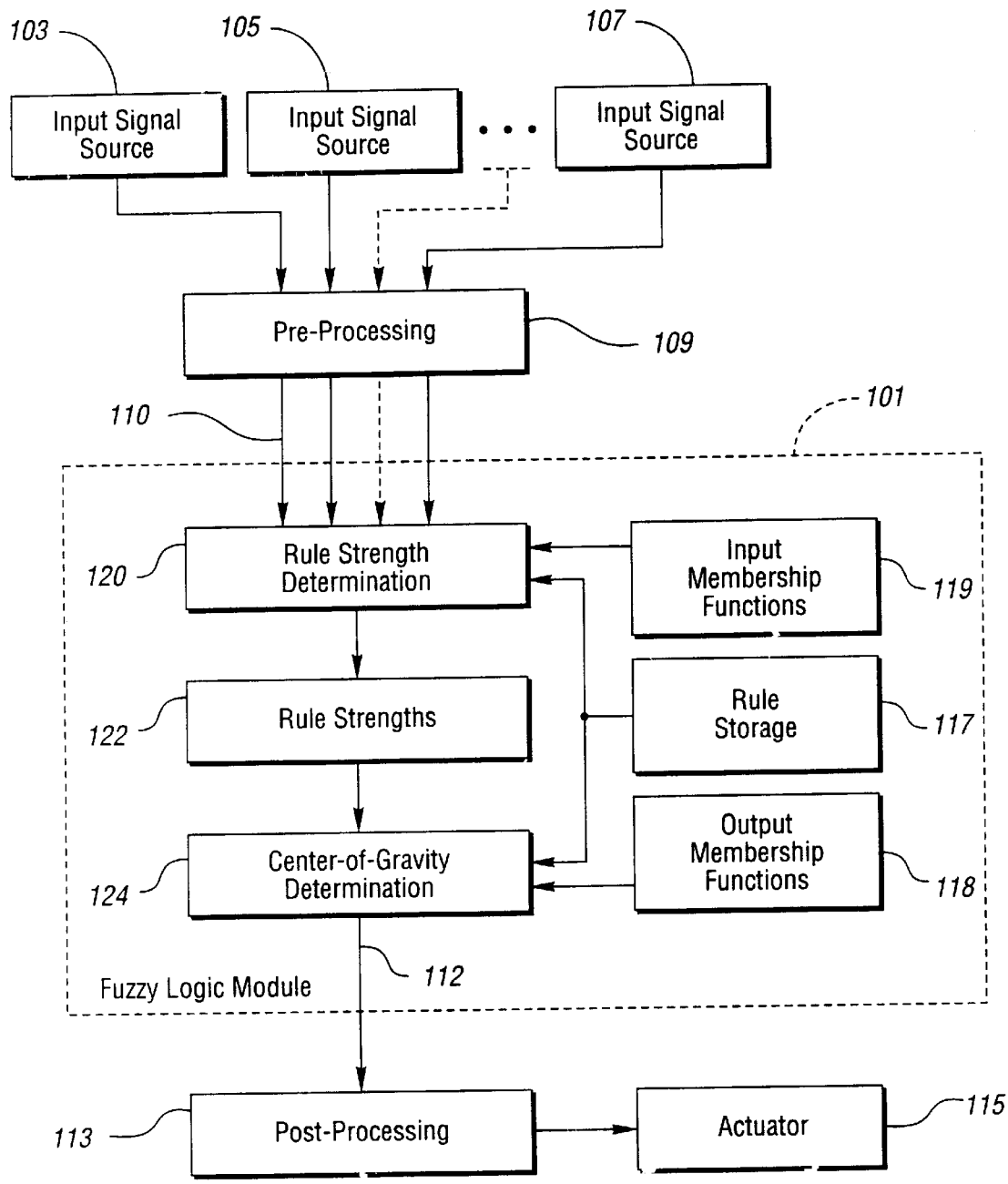
FIG. 1 is a block diagram illustrating the functional organization of the preferred embodiment of the present invention.

The embodiment of the invention to be described utilizes a programmed microcontroller to perform general-purpose fuzzy logic control functions as generally shown in FIG. 1 of the drawings. The fuzzy logic module 101 accepts input signals from a plurality of sources 103, 105 and 107, each signal being pre-processed at 109 to form normalized digital signals which take the form of integer values supplied to the module 101 by the fuzzy logic inputs 110. The module 101 repeatedly processes the current value of the digital input signals 110 to produce a sequence of digital integer output values at 112. This sequence of output values is then translated by suitable post-processing at 113 into a control signal for driving a utilization device, such as the actuator 115 seen in FIG. 1.

The logic module 101 creates the integer output signal values at 112 by comparing the input signals at 110 with conditions defined in a group of rules stored in memory at 117. The conditions expressed in the rules identify input membership functions which are stored at 119. The identified input membership functions from 119 are then used at 120 to determine a "rule strength" value for each rule indicating the extent to which the rule's input conditions are satisfied by one or more of the input signal value(s) at 110. The resulting rule strength values are stored temporarily at 122.

Using these stored rule strength values and the output membership functions 118, the module then determines a "center-of-gravity" value at 124 yielding the output integer value at 112. The center-of-gravity determination is performed by integrating output degree-of-membership functions stored at 118 over the range of possible output integer values, each degree-of-membership value being limited by the rule strength values stored at 122. The results from the integration are then processed to form a center-of-gravity value delivered as the "de-fuzzified" output integer value at 112. This output integer represents the consensus of all of the rules whose conditions are satisfied, to varying degrees, by the input signal values at 110, and is converted by post-processing into a signal magnitude appropriate for controlling a utilization device, such as the actuator 115 shown in FIG. 1.

In a typical fuzzy logic application, a rule set of more than one rule having at least one input membership function is required in order to obtain a significant or useful variation in output. In the standard defuzzification process, the output membership functions remain fixed in position but are altered (clipped or scaled) in shape according to the corresponding rule strength. The present invention allows specification of a single rule set that is defuzzified by having the position of the output function change, but not its shape or area value. This is accomplished by taking the evaluation of the combination of antecedent membership functions as the position of the output membership function. The effect is to have the rule strength for that rule pass as a directly varying output to the resultant, rather than have a varying fixed-position area that can only produce a changing resultant when weighed against other rule outputs. Thus, unlike the standard algorithm, a rule set of only one rule can produce a usefully varying response. With this directly varying output, it is possible to have a closer correspondence between the parameters that specify a membership function and the resultant output value.

The method and system of the present invention will be further illustrated utilizing an automotive heating, ventilating, and air conditioning (HVAC) system as an example. A fundamental goal of automotive heating, ventilating, and air conditioning (HVAC) systems is to make vehicle occupants comfortable. To achieve this goal, it is important that the design of the control system that establishes cabin conditions takes into account the relationship between comfort and the variables that affect comfort. Human comfort is a complex reaction, involving physical, biological, and psychological responses to the given conditions. Because of this complexity, the engineer must consider many variables and their possible interaction in the design strategy of such a control system or controller.

The controller must sort out the range of possible conditions, determine what is needed to achieve comfort, and coordinate the control of the actuators of the system. This multiple input, multiple output control problem does not fall into any convenient category of traditional control theory. The performance criterion, comfort, is not some well defined formula but a sometimes inconsistent goal, empirically determined. In particular, comfort control is not the same as temperature control. The response of the system as well as the relationship between system variables and desired performance, comfort, is rarely linear. Also, it is important to note that despite all the actuators and variables available for control, there may exist conditions under which comfort may not be achievable.

Thus, the use of fuzzy logic is well suited for specifying a strategy for comfort control, such as controlling blower speed and/or air discharge temperature (or blend door position).

Figure 2:
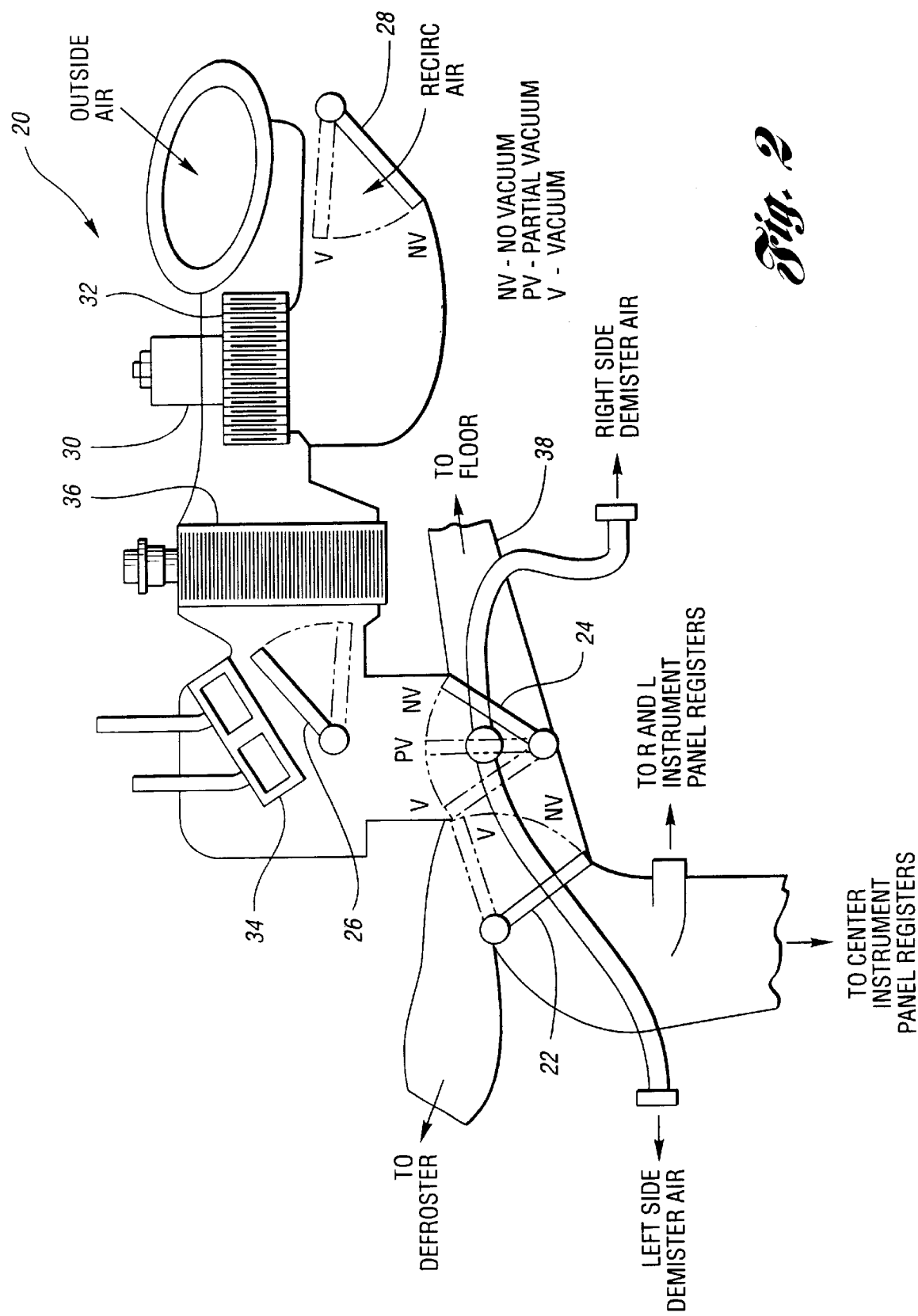
FIG. 2 is a schematic diagram illustrating an air handling system which can be controlled by the method and control system of the present invention.

In general, control of temperature within an automobile is accomplished using various actuators to adjust the temperature and flow of air supplied to the cabin of the vehicle. FIG. 2 shows schematically an air handling system of an HVAC system, generally indicated at 20. The system 20 includes the arrangement of panel-defrost, floor-panel, temperature blend and outside recirc air actuators or doors 22, 24, 26 and 28, respectively. The doors 22, 24 and 28 are driven by vacuum motors (not shown) between their various vacuum, partial vacuum and no vacuum positions in a conventional fashion as indicated in FIG. 2. The door 26 is driven by an electric servo motor also in a conventional fashion.

The system 20 also includes a variable speed blower motor or fan 30 including a blower wheel 32.

The system 20 further includes heating and cooling elements such as a heater core 34 and an evaporator core 36 in a typical vehicle air conditioning plant. Each of the above components is in communication with ducting 38 in order to control temperature, the direction of air flow and the ratio of fresh air to recirculated air.

Figure 3:
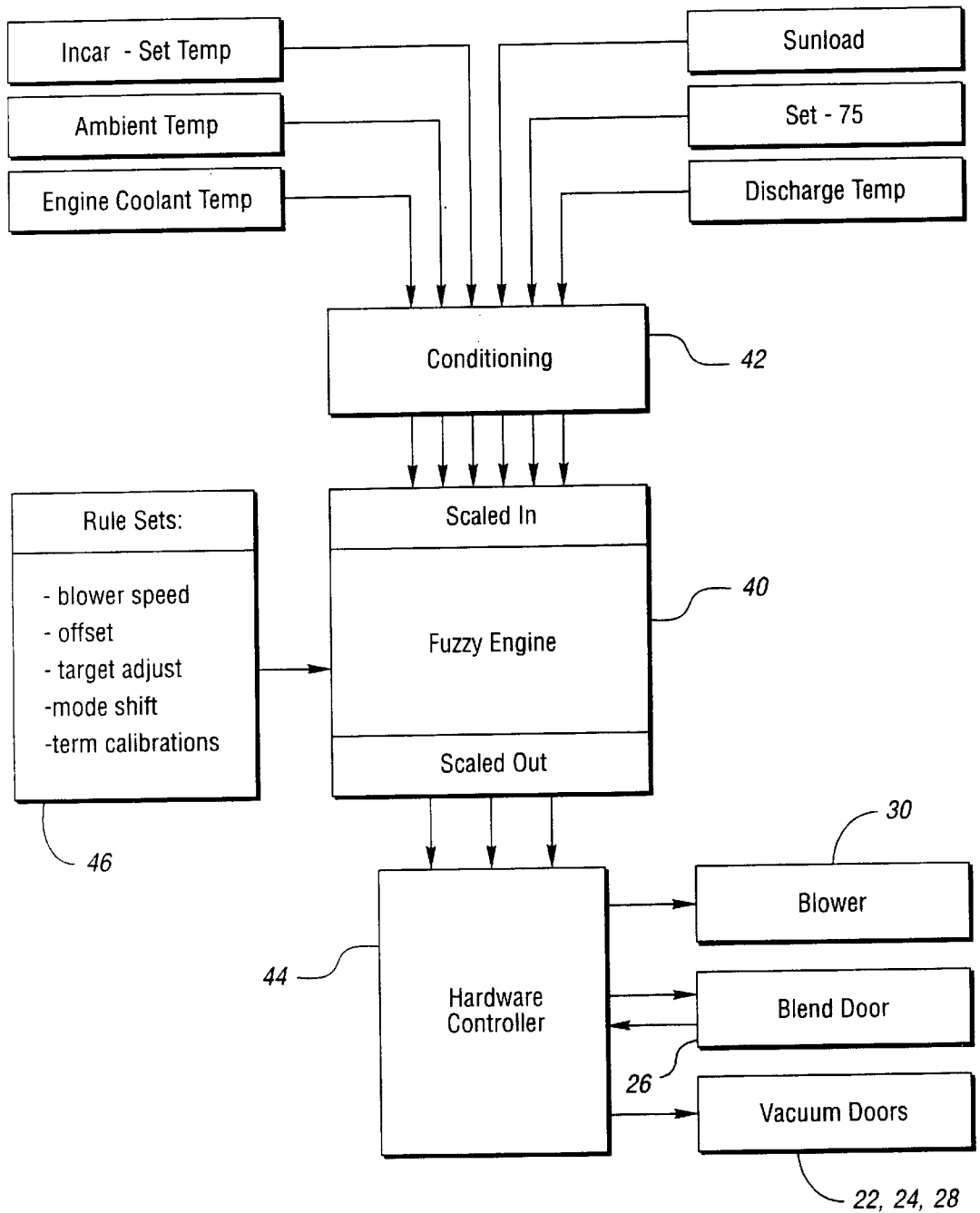
FIG. 3 is a schematic block diagram of an air handling control system utilizing the teachings of the present invention.

For automatic control of the temperature and flow of air in the cabin, conditions within and outside the cabin are monitored by sensors and an electronic controller generates signals to control the plant actuators according to the conditions as indicated by the sensors. As illustrated in FIG. 3, a typical complement of sensors of the HVAC system provide signals which are representative of in-car temperature, ambient (outside) air temperature, engine coolant temperature (ECT), discharge air temperature and sunload. In addition, there is a set signal or set temperature value indicating the desired temperature that is set manually by the driver. In turn, an incar-set temperature (in-car minus set temperature) signal and a set-75 (set temperature minus 75 degrees Fahrenheit) signal are generated or calculated.

The signals are provided to an electronic controller 40 as inputs after being conditioned by a conditioning circuit 42.

The controller 40 scales the input signals and provides scaled output signals for use by a hardware controller 44 which, in turn, controls the doors 22 through 28 and the blower motor 30 to regulate the temperature and flow of air and ultimately to maintain the comfort of driver and passengers in the vehicle.

The sensor inputs are conditioned, scaled, and passed to a fuzzy inference engine of the controller 40. Rule sets 46 for the various control functions–blower speed, offset, target set point, mode shift, recirculation/fresh mode shift, term calibrations, etc. provide the inference engine with the details of the strategy to be performed. The fuzzy outputs are scaled and passed to the routines to control the motors, actuators, and doors that accomplish the flow and conditioning of the air supplied to the passenger compartment. The rule set basis for control organizes the strategy in a manner that allows easy calibration and adjustment of the control operation.

As an example of the use of fuzzy logic for control, the desired blower speed of an automobile HVAC system 20 can be considered a function of temperature error (in-car temperature–set point temperature) and engine coolant temperature (ECT). If the error is small, low blower speed is desired. If the error is positive and high (i.e., it's hot inside), high speed is needed to cool the cabin down. If the error is negative (i.e., it's cold inside) and the engine is cold, a little speed is needed for defrost, but if the engine is warm, high speed is needed to heat up the cabin. The descriptions "small error", "high speed", etc., are typically defined by membership functions in the set of rules shown in FIGS. 4a–4d.

In FIGS. 4a–4d, the degree to which a rule holds is computed from the antecedent membership functions on the left which are dependent on their respective input values. The consequent membership functions on the right define the degree of control action (blower speed) to be taken when the antecedent condition pertains. Evaluation of the four rules gives a desired blower speed response.

Figure 6:
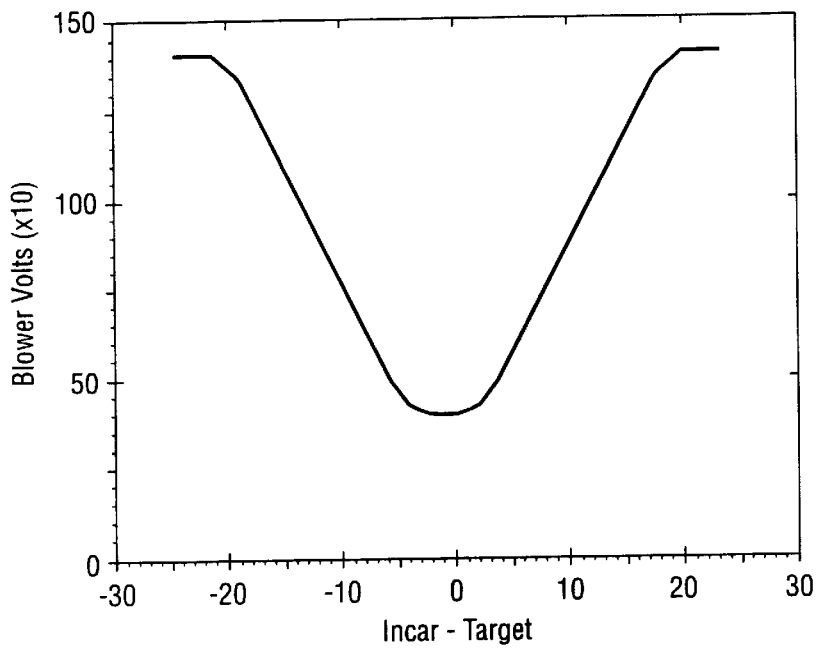
FIG. 6 is a graphical illustration of a typical two-dimensional blower speed warm-up response.

In order to obtain the same desired response in a more compact form, the present invention utilizes table look-up functions in a single rule. For example, the membership functions needed to obtain the same blower speed response utilizing a single rule, Rule 0, are shown in FIG. 5. There are actually three antecedent membership functions in the rule to produce a two-dimensional blower speed warm-up response, as shown in FIG. 6. They are: 1) blower warm-up (0–100%) as a function of ECT; 2) a switch allowing 100% blower if it is warm inside the vehicle (Incar–Setpt>0); and 3) blower speed as a function of (Incar–SetPt). These antecedents are combined by the "maximum" function (OR) for the first two antecedents and "times" (AND) for last antecedent.

The logic of this rule is as follows: blower is 100% if ECT high or 100% if (Incar–SetPt) is positive and blower is high if (Incar–SetPt) is not zero. Thus, one rule does the job of the four fuzzy logic rules illustrated in FIGS. 4a–4d.

Figure 7A:
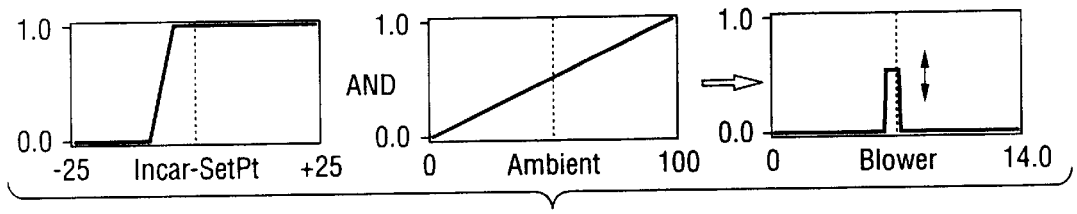
FIGS. 7a through 7c are graphical illustrations of various rules that can be combined with the rule shown in FIG. 5.
Figure 7B:
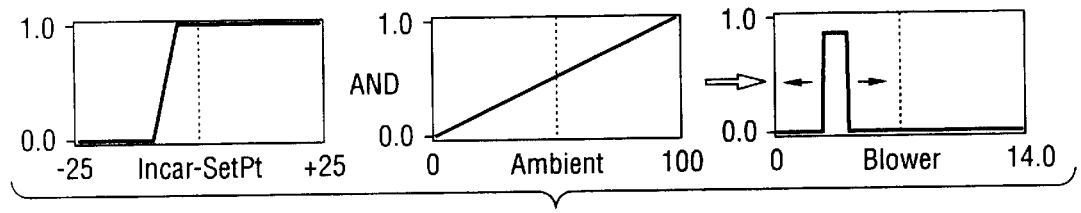
Figure 7C:
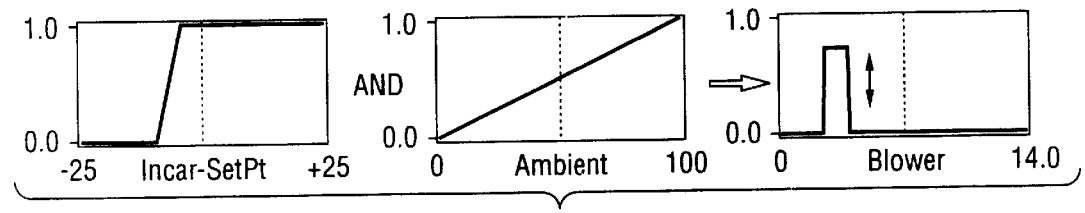
Figure 8:
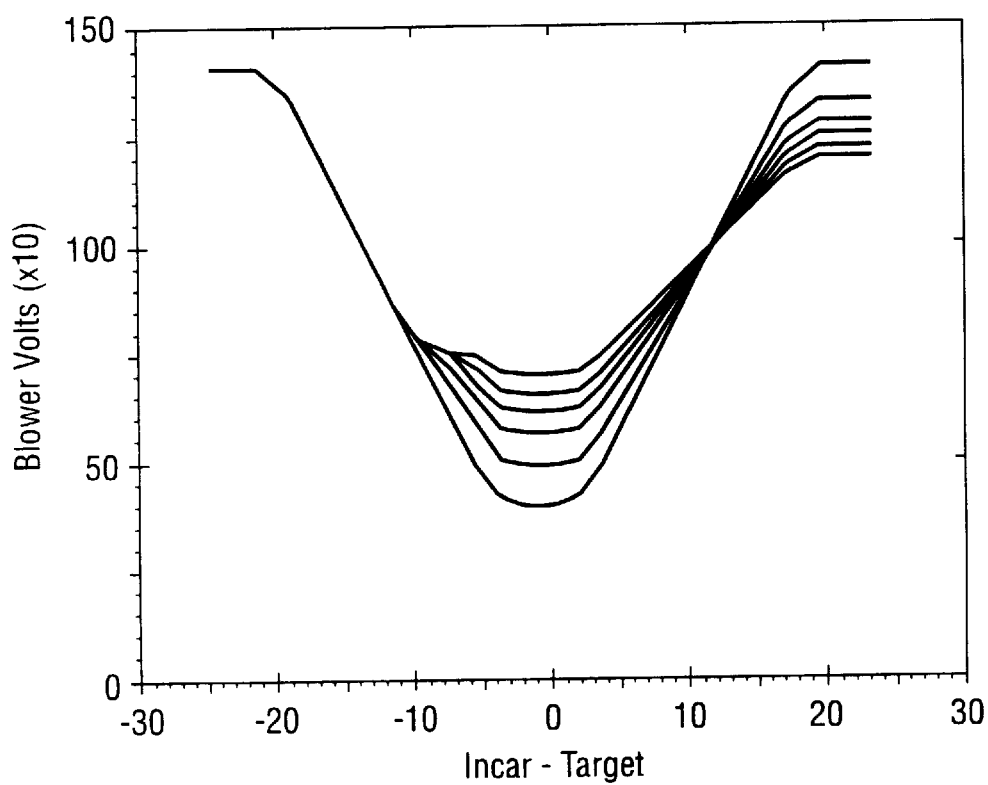
FIG. 8 is a graphical illustration of a blower speed response curve for various ambient temperatures.

A feature of the present invention is that the typical response curve resulting from the one-rule algorithm of the present invention can still be modified by the addition of further rules. For example, the valley minimum as well as the warm side response can be altered as a function of ambient temperature. Such a modification could be performed by adding a second rule, as shown in FIG. 7a, in which the logic is as follows: if (incar–target) is high and ambient is high, then blower speed is high. The response curves for different and equally spaced ambient temperatures are plotted in FIG. 8. For evaluation type 1, the shape and area of the output function is changed by clipping or scaling while its position remains fixed—which is the standard fuzzy logic means of evaluating and defuzzifying. The effect of this type of evaluation of a new rule varies as the output of Rule 0 varies, as seen in FIG. 8—even reversing for values of Rule 0 past a certain point. To have a more consistent effect with respect to Rule 0, evaluation types 2 and 3 (FIGS. 7b and 7c) position their output functions relative to the output function of Rule 0. In other words, Rule 0 establishes a base arm for the weighted sums calculation and evaluation type 2 adds to (or subtracts from) that arm for the calculation of its contribution to the moment while keeping its area fixed. Evaluation type 3 positions its output function relative to the base arm, but scales or clips its area while holding its relative position fixed. These two additional types of evaluation provide more flexibility and utility in response, given that the position of Rule 0's output function is considerably more variable than in the usual method of defuzzification.

Figure 9:
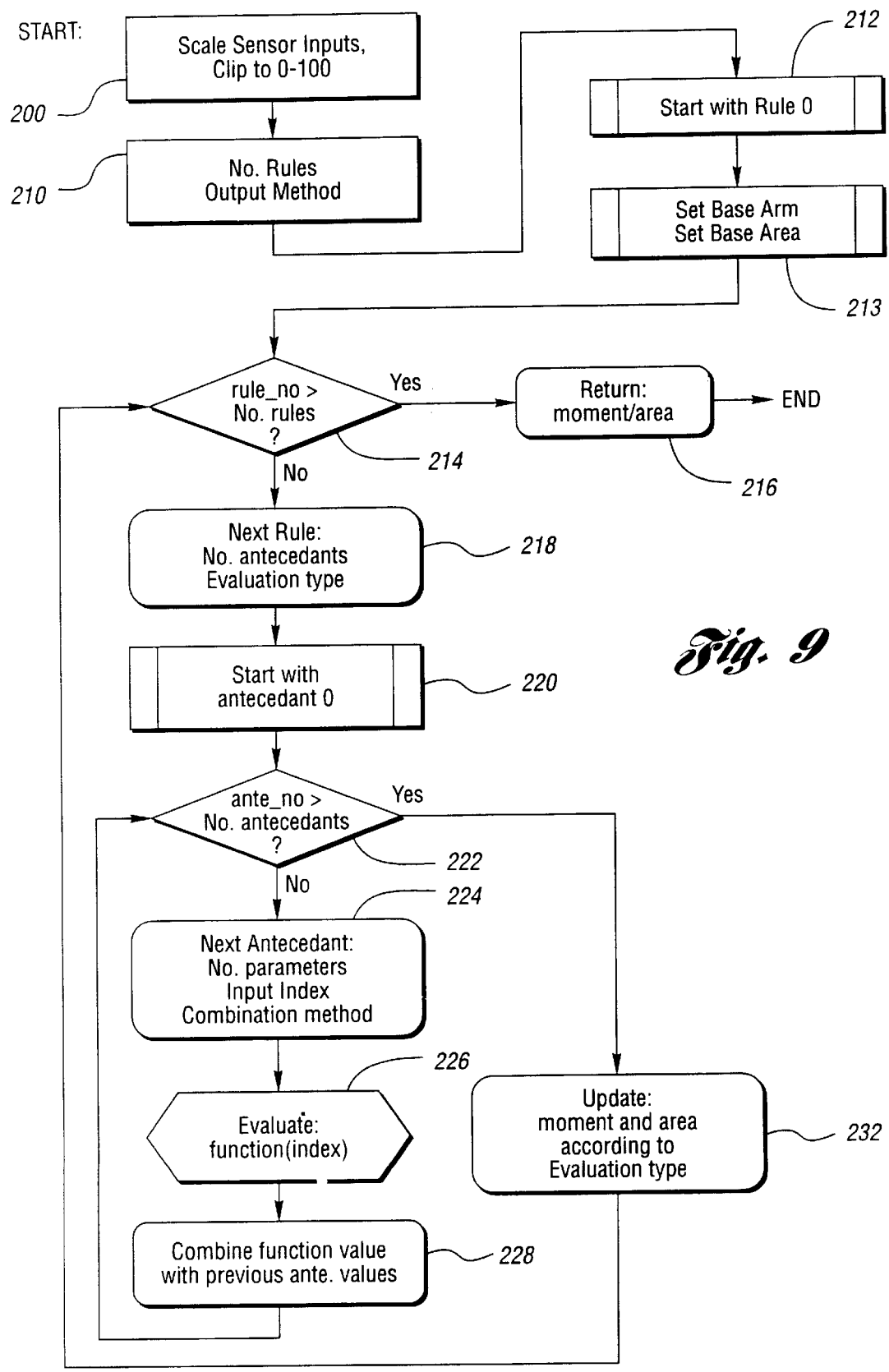
FIG. 9 is a flow diagram illustrating the general sequence of steps associated with the operation of the present invention.

Turning now to FIG. 9, there is shown a flow diagram illustrating the general sequence of steps associated with the method of the present invention. The method begins with the step of scaling the input signals from the sensors so that they are clipped into a useful integer range, such as 0–100, as shown at block 200.

Next, the method determines the number of rules in the particular rule set being accessed and the output method to be utilized, such as weighted sums or clipped, as shown at block 210. Operation begins with the first rule (or Rule 0), in which the base arm and moment are established, as shown at blocks 212 and 213. At conditional block 214, a determination is made as to whether the rule number (rule_no) is greater than the number of rules in the rule set. If so, all the rules have been acted upon and the method proceeds to the defuzzification step, at block 216, where the center of gravity is determined based on the moment and area.

If there are other rules, the method proceeds to determine the number of antecedents in the next rule and the evaluation type, as shown at block 218. The evaluation type indicates the type of modification performed at the defuzzification step, as described above. The consequent functions for all the rules are evaluated by the usual center-of-gravity or weighted sums calculation.

Beginning with the first antecedent, the method proceeds to determine whether the current antecedent number exceeds the total number of antecedents in the rule set, as shown at block 220 and conditional block 222.

If all of the antecedents have not been traversed, the method proceeds to the next antecedent, as shown at block 224, and obtains various information, such as the number of parameters involved in the present antecedent, the input index (i.e., horizontal or vertical axis), and the combination method (i.e., AND, OR, etc.). The antecedent is then evaluated at block 226 as a function of the index.

The function value is combined with the previous antecedent values according to the combination method, as shown at block 228.

Returning to conditional block 222, if all of the antecedents have been traversed, the moment and area are updated according to the Evaluation type, as shown at block 232.

While the best modes for carrying out the invention have been described in detail, those familiar with the art to which this invention relates will recognize various alternative designs and embodiments for practicing the invention as defined by the following claims.

Software Implementation

As previously indicated, the present invention advantageously takes the form of a sharable, multipurpose fuzzy logic mechanism implemented by means of a microprocessor and memory containing suitable programs and data structures for providing the desired fuzzy logic functions. The following C language routine is executable on a Motorola HC11 microcontroller (as converted into an executable module using a corresponding Motorola Assembler/Linker/Compiler, both of which are available from Motorola).

---

SOURCE LANGUAGE LISTING
Fuzzy Control Routine
Copyrighted 1996 Ford Motor Company

---

```c
#include <stdio.h>
const unsigned char fz_map[49]={
1,0,
0,100,100,3,
14,2,0,
0,0,
12,0,
25,10,
35,20,
50,50,
80,100,
100,100,
4,1,1,
50,0,
51,100,
16,1,2,
0,140,
10,140,
40,50,
45,40,
55,40,
60,50,
90,140,
100,140,
};

FILE   * fp;

unsigned char del,incar,ect,amb,sun;        /* temps for demo mode */
unsigned char i;                /* index into map array */
unsigned int j;                 /* index into fuzzy data table array */
unsigned char rule;             /* current rule number */
unsigned char ruleptr;          /* current rule base index into map */
unsigned char fnptr;            /* current function base index into map */
unsigned char noclauses;        /* max clause for current rule */
unsigned char clause;           /* current clause number */
unsigned int arm;               /* moment arm for current rule output */
unsigned char curr_area;        /* singleton area for current rule */
unsigned int area;              /* sigma area over all rules for centroid */
unsigned int moment;            /* sigma moment over all rules */
unsigned char combined_area;    /* area after comb. with antecedent */
unsigned char combined_offset;  /* output offset after comb. with ant */
signed char analog[6];          /* array for scaled vals from input vars */
int fblower;                    /* blower fuzzy output */
int blower;                     /* final fuzzy blower output */
int valavg;                     /* val average */
int target;                     /* target temp from valavg equation */
int volts;                      /* calculated blower volts */ define MAXFUZZ      140
define MAXPERCNT    100
#define INITRULE     2
#define FNOFFSET     4
#define PAROFFSET    3
#define MAXINPUTS    5                      /* max number of input variables    */
#define NORULES      fz_map[0]              /* number of rules in fz_map array  */
#define OUTMETHOD    fz_map[1]              /* output method 0-normal, 1=submerged */
#define EVALTYPE     fz_map[ruleptr]        /* rule output evaluation type      */
#define ARM_OFFS     1                      /* rule output moment position (arm) */
#define AREA_OFFS    2                      /* rule output area                 */
#define NOANTE       fz_map[ruleptr+3]      /* rule no. of antecedents          */
#define NOPARS       fz_map[fnptr]          /* fuzzy memb. no. parameters       */
#define INPINDEX     fz_map[fnptr+1]        /* fuzzy memb. input variable index */
#define COMBMETHOD   fz_map[fnptr+2]        /* fuzzy MIN/MAX combination method */

/*      fz_map[0]                           number of rules in fz_map array   */
/*      fz_map[1]                           output method 0=normal, 1=submerged */
/*      fz_map[ruleptr]                     fuzzy output evaluation type      */
/*      fz_map[ruleptr+ARM_OFFS]            fuzzy output moment arm           */
/*      fz_map[ruleptr+AREA_OFFS]           fuzzy output area                 */
```

SOURCE LANGUAGE LISTING
Fuzzy Control Routine
Copyrighted 1996 Ford Motor Company

```
/*      fz_map[ruleptr+3]              fuzzy output no. of antecedents        */
/*      fz_map[ruleptr+FNOFFSET]=      fz_map[ruleptr+4] Start of indiv.      */
/*      = fz_map[fnptr]                antecedent membership functions        */
/*      fz_map[fnptr]                  fuzzy memb. fn. no. parameters         */
/*      fz_map[fnptr+1]                fuzzy memb. fn. input variable index   */
/*      fz_map[fnptr+2]                fuzzy MIN/MAX combination method       */

/* do a fuzzy evaluation from pointers to fz_map array */
unsigned char new_fuzzy(const unsigned char fz_map[], int details)
{
        int indx, val, npars, nparsum, parptr, out, base_arm;
        /* Scaling:                                                   */
        /* Coming in, assume following ranges:                        */
        /*      incar   --   10 to 240    (for 5 to 120 degF)         */
        /*      target  --    5 to 120    (for 5 to 120 degF)         */
        /*      ect     --  100 to 180    (for 100 to 180 degF)       */
        /*      amb     --    0 to 100    (for 0 to 100 degF)         */
        /*      sun     --    0 to 100    (for 255 to 130 cnt.)       */
        /*      valavg  --    0 to 100    (for 0 to 255 arb.)         */
        /* DEL= -25 TO +25 scaled to 0 to 100 full range */
        analog[1]= incar - 2*target + 50;         /* incar-target */

/* ect = 100 to 180 scaled to 0 to 100 */
        analog[2]= 100 * ect /80 - 125 ;          /* ECT          */

/* amb = 0 to 100 scaled to 0 to 100 */
        analog[3]= amb ;                          /* amb          */

/* sun = 255 to 135 scaled to 0 to 100 */
        analog[4]= 100 * (255 - sun)/120;         /* sun          */

/* valavg = 0 to 255 scaled to 0 to 100 */
        analog[5]= 100 * valavg / 255;            /*valavg */

/* clip all inputs */
        for (i=1;i<=MAXINPUTS;i++) {
          if (analog[i]<0) analog[i]=0;
          if (analog[i]>100) analog[i]=100;
        }
ruleptr = INITRULE;                   /* initially point to rule 0          */
nparsum = 0 ;                         /* no. parameters is variable         */
area=0; moment=0;                     /* clear sums for centroid            */
for(rule=0; rule<NORULES;rule++) {
   noclauses = NOANTE ;               /* number of clauses in rule          */
   fnptr = ruleptr + FNOFFSET;
   if (COMBMETHOD == 0)  out = MAXFUZZ ;
   if (COMBMETHOD ==1)   out = 0 ;
   if (COMBMETHOD ==2)   out = MAXPERCNT ;
   val = 0 ;
   nparsum = 0;                       /* ruleptr holds prev. accum.         */
   for(clause=0; clause<noclauses;clause++) {
      fnptr = ruleptr + FNOFFSET + nparsum ;
      npars = NOPARS ;
      indx = INPINDEX ;
      parptr = fnptr + PAROFFSET ;
      val = mem_table (analog[indx], npars, parptr);
      nparsum += npars + PAROFFSET;
      /* combine clause with previous clause out */
           if (COMBMETHOD ==0)     out = minimum (out, val) ;
           if (COMBMETHOD ==1)     out = maximum (out, val) ;
           if (COMBMETHOD ==2)     out = out * val / MAXPERCNT ;
   }  /* end of clause loop, out is rule strength */
        /* rule 0 is special, establishes base arm */
   if (rule == 0) base_arm = out ;
curr_area = fz_map[ruleptr+AREA_OFFS] ;
switch (EVALTYPE) {
        Case 0:               /* use out as moment arm, area fixed */
              arm      = out;
              moment  += arm * curr_area ;
              area    += curr_area;   break;
        Case 1:               /* use out as scale for area, arm fixed */
              arm       = fz_map[ruleptr+ARM_OFFS] ;
           curr_area    = out * curr_area/MAXPERCNT ;
              moment   += arm * curr_area ;
              area     += curr_area ;  break;
```

SOURCE LANGUAGE LISTING
Fuzzy Control Routine
Copyrighted 1996 Ford Motor Company

```
            Case 2:                 /* use out as position rel. to base, area fixed */
                    arm     = base_arm + out;
                    moment  += arm * curr_area ;
                    area    += curr_area ;  break;
            Case 3:                 /* use out as scale for area, arm rel. to base */
                    arm     = base_arm + fz_map[ruleptr+ARM_OFFS] ;
                    curr_area =out * curr_area / MAXPERCNT ;
                    moment  += arm * curr_area ;
                    area    += curr_area ;  break;
            default:                        break;
    }
    ruleptr += FNOFFSET + nparsum ;
    } /* end of rule loop */
    if(area!=0)             /* avoid division by zero */
        return(moment/area);    /* return 0-255 fuzzy output */
    else return(127);       /* return mid-Level if rule not active */
} /* end of fuzzy */ int mem_table(input,npar,parin)
int     input, npar, parin;
{
        int val, slope, diffin, diffy, diffx, incry;
        int i;

if(input <= fz_map[parin+0]) return fz_map[parin+1];
        if(input >= fz_map[parin+npar-2]) return fz_map[parin+npar-1] ;
        for (i=2; i<npar-1;i=i+2){
                if(input <= fz_map[parin+1]){
                        diffin =input - fz_map[parin+i-2] ;
                        diffy = fz_map[parin+i+1] - fz_map[parin+i-1] ;
                        diffx = fz_map[parin+i] - fz_map[parin+i-2] ;
                        incry = diffin * diffy / diffx ;
                        val = fz_map[parin+i-1] + incry ;
                        return val;
                }
        }
        return val;
} int minimum (x,y)
int x,y;
{
        if(x <y)        return (x);
        else            return (y);
}
int maximum (x,y)
int x, y;
{
        if(x >y)        return (x);
        else            return (y);
} int mem_table(input,npar,parin)
int input, npar, parin ;
{
        int val, slope, diffin, diffy, diffx, incry;
        int i;

if(input <= fz_map[parin+0]) return fz_map[parin+1];
        if(input >= fz_map[parin+npar-2]) return fz_map[parin+npar-1] ;
        for (i=2; i<npar-1;i=i+2){
                if(input <=fz_map[parin+i]){
                        diffin = input - fz_map[parin+i-2] ;
                        diffy = fz_map[parin+i+1] - fz_map[parin+i-1] ;
                        diffx = fz_map[parin+i] - fz_map]parin+i-2] ;
                        incry = diffin * diffy/diffx ;
                        val = fz_map[parin+i-1] + incry ;
                        return val;
                }
        }
        return val;
} int minimum (x, y)
int x, y ;
{
```

SOURCE LANGUAGE LISTING
Fuzzy Control Routine
Copyrighted 1996 Ford Motor Company

```
        if(x < y)       return (x);
        else            return (y) ;
} int maximum (x, y)
int x, y ;
{
        if(x > y)       return (x);
        else            return (y) ;
}
```

What is claimed is:

1. A method for producing a varying output signal utilizing one fuzzy logic rule, the method comprising:

receiving a plurality of input signal values;

defining a plurality of membership functions in the one fuzzy logic rule having a predetermined combination wherein a first instance of the predetermined combination based on a first set of input signal values yields a first output signal defined by a first and second axes and wherein a second instance of the predetermined combination based on a second set of input signal values different from the first set of input signal values yields a second output signal substantially identical to the first output signal, except the second output signal is shifted along one of the first and second axes; and producing digital output signals based on the first and second output signals to produce the varying output signal.

2. The method as recited in claim 1 further comprising controlling a device of an automotive vehicle based on the digital output signals.

3. The method as recited in claim 1 wherein defining the plurality of membership functions includes defining at least one lookup table.

4. The method as recited in claim 1 wherein the one of the first and second axes is a horizontal axis.

5. The method as recited in claim 1 wherein the one of the first and second axes is a vertical axis.

6. The method as recited in claim 2 wherein the device is a variable speed blower of a heating, ventilation and air conditioning (HVAC) system and wherein receiving the plurality of input signal values includes sensing an interior temperature of the vehicle and wherein controlling the device includes controlling the speed of the blower.

7. The method as recited in claim 2 wherein the device is an electronically-controlled blend door of a heating, ventilation and air conditioning (HVAC) system for varying air temperature in the vehicle and wherein receiving the plurality of input signal values includes sensing an interior temperature of the vehicle and wherein controlling the device includes controlling the resistance of the blend door.

8. The method as recited in claim 1 wherein defining the plurality of membership functions further includes defining a second plurality of membership functions of a second rule set wherein a combination of the membership functions of the first rule and the second rule sets yields a third output signal having one of a shape and area different from the first and second output signals.

9. A system for producing a varying output signal utilizing one fuzzy logic rule, the system comprising:

a plurality of sensors for sensing a plurality of input signal values; and a controller operative to store a plurality of predefined membership functions of the fuzzy logic rule having a predetermined combination wherein a first instance of the predetermined combination based on a first set of input signal values yields a first output signal defined by a first and second axes and wherein a second instance of the predetermined combination based on a second set of input signal values different from the first set of input signal values yields a second output signal substantially identical to the first output signal, except the second output signal is shifted along one of the first and second axes, and to produce digital output signals based on the first and second output signals to produce the varying output signal.

10. The system as recited in claim 9 wherein the controller is further operative to control a device of an automotive vehicle based on the digital output signals.

11. The system as recited in claim 9 wherein the controller, in storing the membership functions, is further operative to store at least one lookup table.

12. The system as recited in claim 9 wherein the one of the first and second axes is a horizontal axis.

13. The system as recited in claim 9 wherein the one of the first and second axes is a vertical axis.

14. The system as recited in claim 10 wherein the device is a variable speed blower of a heating, ventilation and air conditioning (HVAC) system and wherein the plurality of sensors includes a sensor for sensing an interior temperature of the vehicle and wherein the controller, in controlling the device, is further operative to control the speed of the blower.

15. The system as recited in claim 10 wherein the device is an electronically-controlled blend door of a heating, ventilation and air conditioning (HVAC) system for varying air temperature in the vehicle and wherein the plurality of sensors includes a sensor for sensing an interior temperature of the vehicle and wherein the controller, in controlling the device, is further operative to control the resistance of the blend door.

16. The system as recited in claim 9 wherein the controller, in storing the membership functions, is further operative to store a second plurality of membership functions of a second rule set wherein a combination of the membership functions of the first rule and the second rule sets yields a third output signal having one of a shape and area different from the first and second output signals.

* * * * *